Patented Jan. 13, 1948

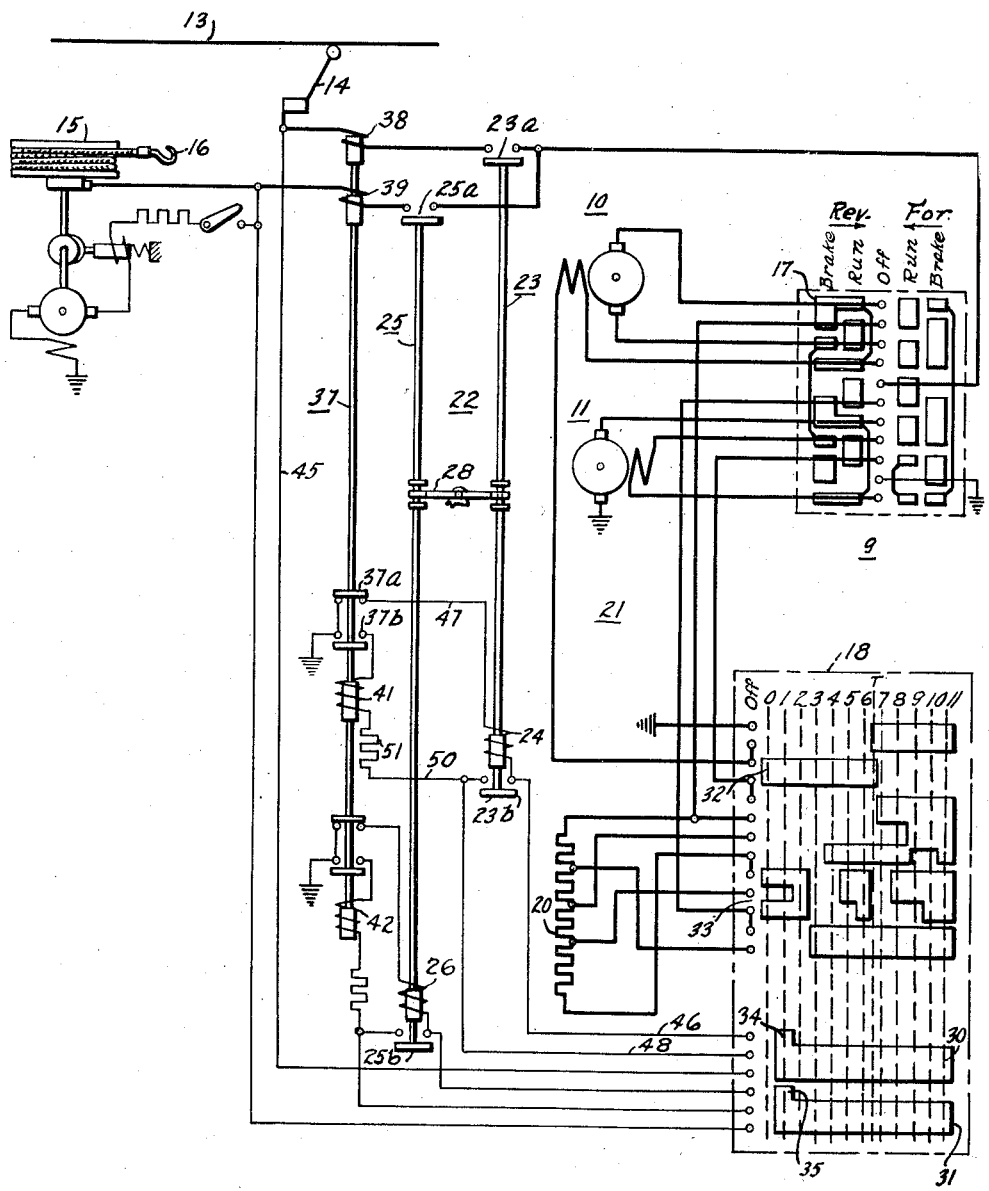

2,434,585

UNITED STATES PATENT OFFICE 2,434,585

CONTROL SYSTEM FOR VEHICLES WITH MULTIPLE CURRENT SOURCE

David E. Renshaw, Forest Hills, and Herman C. Krapf, Wilkinsburg, Pa., assignors to Westinghouse Electric Corporation, East Pittsburgh, Pa., a corporation of Pennsylvania Application December 16, 1943, Serial No. 514,498

11 Claims. (Cl. 191—3)

Our invention relates, generally, to control systems, and it has reference in particular to control systems for electrically-operated vehicles such as mine locomotives.

Generally stated, it is an object of our invention to provide a locomotive control system which is simple and inexpensive to manufacture and is easy to operate.

More specifically, it is an object of our invention to provide for using a trolley-cable reel transfer switch on a mining locomotive also as a line contactor for completing and interrupting the locomotive power circuit, thereby relieving the locomotive controller of this relatively heavy duty service.

Another object of our invention is to provide for controlling the operation of a trolley-cable reel transfer switch on a mining locomotive so as to provide reduced voltage protection for the power circuit of the locomotive.

Yet another object of our invention is to provide for so controlling the operation of a trolley-cable reel transfer switch on a locomotive through the main controller as to prevent the controller from interrupting the locomotive power circuit.

It is also an object of our invention to provide for interrupting the power circuit of a trolley-cable reel operated vehicle by operating a trolley-cable reel transfer switch under the control of a circuit protective device to perform this function.

Other objects will in part be obvious, and will in part be described hereinafter.

According to our invention, the operating circuit of a trolley-cable reel transfer switch for connecting the power circuit of a mining locomotive to a power source through either a trolley or a cable reel, is completed through the vehicle controller so that the switch operates as a line contactor for making and breaking the connection of the power circuit to the source, in addition to connecting the power circuit to whichever of the trolley device or cable reel is connected to the source of electrical energy. A protective relay is provided in the operating circuit of the transfer switch for operating the transfer switch to de-energize the power circuit upon overload, and reduced voltage protection is provided by having the operating circuit for the transfer switch completed through the controller in only an initial operating position of the controller so that the controller must be returned to the initial operating position to operate the transfer switch, should it open under operating conditions.

For a more complete understanding of the nature and scope of our invention, reference may be made to the accompanying drawing in which the single figure illustrates diagrammatically a control system for a mining locomotive embodying the invention in one of its forms.

Referring to the drawing it will be seen that a pair of traction motors 10 and 11 for driving a vehicle such as the locomotive may be arranged for connection to a main source of electrical energy (not shown) through a trolley conductor 13, by current collecting means such as either a trolley device or a cable reel 15 having a hook 16 for attachment to the trolley conductor 13. A controller 9 having a reversing drum 17 with a plurality of "forward" and "reverse" positions, and an operating drum 18 with a plurality of contact segments and having an "off" position, an initial operating position "0," and a plurality of running positions 1 through 11, may be provided for controlling the connection of control means such as the resistor 20 to the motors, and changing their connections from series to parallel relations under different operating conditions. Any suitable type of controller may be used such as the conventional type having the reversing and operating drums in the same casing with manually-actuated means for separately operating the drums.

In order to provide for controlling the connection of the power circuit 21 of the vehicle, including the motors and control resistor, to the trolley device 14 or the cable reel 15, transfer means 22 may be provided. Such means may comprise, for example, a trolley transfer switch 23 having an operating winding 24 and a cable reel transfer switch 25 having an operating winding 26. Interlocking means either mechanical or electrical may be provided for preventing closure of both of the switches at the same time, such as, for example, the mechanical means 28, which may be of a type well known in the art.

With a view to utilizing the transfer means 22 not only for connecting the power circuit 21 to the trolley device 14 or cable reel 15, but also as a line switch for making and breaking the power circuit so as to relieve the controller 9 of this relatively heavy duty service, auxiliary contact means may be provided on the operating drum 18 of the controller. For example, contact segments 30 and 31 may be provided for controlling the energization of the operating windings 24 and 26 of the trolley transfer switch 23 and the cable reel transfer switch 25, respectively. In order to provide the maximum protection for the power circuit the segments 30 and 31 may be arranged for completing an operating circuit for the transfer switches only in a predetermined operating position such as, for example, the second operating or first running position of the operating drum 18. The connections of the control resistor 20 and the motors 10 and 11 may, for example, be completed through segments 32 and 33 of the drum 18 in the "0" or first operating position, while the operating circuits for the transfer switches may be completed subsequently through the projecting portions 34 and 35 of the segments 30 and 31, respectively, in the first running position (1) of the drum 18. Holding circuits for the transfer switches may be completed through the body portions of the segments 30 and 31 throughout the other running positions of the drum 18. Accordingly, should the voltage of the trolley conductor 13 fail or be reduced below a predetermined value necessary to retain either of the transfer switches in the operating position, the power circuit will be automatically opened. The power circuit will remain open until the operating drum 18 is returned to the first running position whereupon the operating circuit for the transfer switch may again be completed.

Further protection may be provided for the locomotive power circuit by utilizing a protective device such as the overload relay 37. The overload relay 37 may be provided with operating windings 38 and 39 connected in series circuit relation with the trolley device 14 and the cable reel 15, respectively. Holding windings 41 and 42 may be provided for maintaining the overload relay in the operated position after an overload has occurred. By completing the holding circuits for the transfer switches through contact members of the overload relay, the transfer switches may be used to interrupt the power circuit for the motors 10 and 11 whenever the overload relay operates.

When the reversing drum 17 is operated to the "run" position, either "forward" or "reverse," and the operating drum 18 is moved to the first operating or "0" position, the locomotive motors 10 and 11 are connected in series circuit relation with the control resistor 20, through the reversing drum 17, and contact segments 32 and 33 of the operating drum 18, but they are still disconnected from the source since neither of the transfer switches is closed.

With the trolley device 14 engaging the trolley conductor 13, as shown, an operating circuit is subsequently completed for the operating winding 24 of the trolley transfer switch as soon as the operating drum 18 of the controller is moved to the second operating or first running position "1." The operating circuit may be traced from the trolley device 14 through conductor 45, segment 30 and projection 34 thereof of the operating drum 18, conductor 46, operating winding 24, conductor 47 and normally closed contact members 37a of the overload relay to ground.

The trolley transfer switch 23 operates and the closure of its main contact members 23a connects the motors and control resistor to the trolley conductor 13, thus applying power to the power circuit 21. The closure of its contact members 23b establishes a holding circuit therefor extending from the trolley device 14 through conductor 45, segment 30, conductor 48, contact members 23b, operating winding 24, conductor 47 and contact member 37a to ground. This holding circuit is maintained throughout the remainder of the operating or running positions of the operating drum 18.

Should the voltage of the trolley conductor 13 fail or be reduced below a predetermined value required to maintain the trolley transfer switch 23 in the operated position, the transfer switch 23 opens, interrupting its holding circuit, and at the same time disconnecting the power circuit 21 from the source. Since the operating or closing circuit for the trolley transfer switch 23 may be completed only through the extension 34 on the segment 30, the operating drum 18 must be returned to the "1" or initial running position before the trolley transfer switch can be closed to reenergize the power circuit 21. This arrangement provides undervoltage protection which is very desirable in connection with mining locomotives since voltage failures on a trolley conductor system may occur fairly frequently.

Should an overload occur on the motors 10 and 11 while they are operating, the overload relay 37 operates, opening contact members 37a to interrupt the holding circuit for the trolley transfer switch 23. Accordingly, the transfer switch opens, disconnecting the power circuit from the trolley device. The overload relay 37 is maintained in the operating position by means of the operating winding 41 through a circuit which extends from the trolley device 14 through conductor 45, segment 30, conductor 49, conductor 50, current limiting resistor 51, operating winding 41 and contact members 37b. The overload relay may be returned to the normal operating position by returning the operating drum 18 to the "off" position so as to interrupt the holding circuit for the operating winding 41. The power circuit may then be reenergized by operating the drum 18 in the manner hereinbefore described in the normal operating sequence.

In the event that the drum 18 is returned to the "off" position during normal operation, the transfer switch 23 opens when the drum moves from the "1" to the "0" position, thus deenergizing the power circuit. When the connection of the motors and resistor 20 are interrupted by the drum 18 in moving to the "off" position, no arc is drawn since the circuit is already deenergized.

Should the hook 16 of the cable reel 15 be attached to the trolley conductor 13, instead of the trolley device 14, the operating sequence would be similar to that hereinbefore described except that the cable reel transfer switch 25 operates to connect the power circuit 21 of the locomotive to the conductor 13 through contact members 25a of the cable reel switch, and an operating circuit completed through segment 31 of the operating drum 18 and extension 35 thereof. A holding circuit is completed for the operating winding 26 of the cable reel transfer switch 25 through its contact members 25b and the body portion of the segment 31 in a manner similar to that described hereinbefore in connection with the operation of the trolley transfer switch 23. Under overload or undervoltage conditions, or upon the return of the drum 18 to the "off" position, the cable reel transfer switch 25 opens to interrupt the power circuit in a similar manner to that described hereinbefore in connection with the operation of the trolley transfer switch 23. No arcing duty is thereby imposed on the drum contact segments during the initial closing or final opening of the motor circuits, so that their operating life is greatly increased.

From the above description and the accompanying drawing, it will be apparent that we have provided in a simple and effective manner for utilizing the transfer switches of a trolley-cable reel operated vehicle for not only determining the connections of the vehicle power circuit to whichever of the current collecting devices is connected to the trolley conductor, but have in addition provided for using the transfer switches as line switches for making and breaking the power circuit. Accordingly, the operating duty of the vehicle controller is greatly reduced since the controller is no longer required to complete or interrupt the power circuit. In addition, complete protection is provided for the motors and power circuit of the vehicle by utilizing the transfer switches to provide undervoltage protection and by having them operate under the control of an overload relay, so that all interruptions of the power circuit are made by the transfer switches.

Since certain changes may be made in the above description and different embodiments of the invention may be made without departing from the spirit thereof, it is intended that all of the matter contained in the above description or shown in the accompanying drawing shall be considered as illustrative and not in a limiting sense.

We claim as our invention:

1. In a control system for a power circuit of a machine disposed to be energied from a source of electrical energy through a controller and either of a pair of current conducting means, transfer switch means comprising a single connection between the controller and each of the current conducting means operable to different positions to connect the power circuit to one or another of the current conducting means depending upon which is connected to the source, and circuit means for effecting operation of the switch means to connect the power circuit to the source through the current conducting means including contact means on the controller for completing and interrupting an operating circuit for the switch means when in response to predetermined operations of the controller as it passes a predetermined position wherein the power circuit is set up by the controller.

2. A control system for a power circuit which is disposed to be connected to a source of electrical energy through a controller which provides for controlling connections in the power circuit and either a trolley device or a cable reel device comprising, transfer switch means having a pair of operating windings, and circuit means connecting the one of the operating windings to the trolley device and the other to the cable reel, respectively, including contact means operative in response to operation of the controller to provide an operating circuit for one or another of the operating windings when the controller is in a predetermined position in which the connections of the power circuit through the controller are previously completed depending on which of the devices is connected to the source.

3. In a control system for a power circuit disposed to be connected to a source of electrical energy through a controller and either a trolley device or a cable reel the combination, of transfer means operable to connect the power circuit to either the trolley device or the cable reel device, circuit means including contact means on the controller for providing an operating circuit for operating the transfer means to connect the power circuit to one of the devices, said contact means being effective to provide the operating circuit only when the controller is in a predetermined operating position in which the power circuit is connected through the controller, and additional circuit means providing a holding circuit for maintaining the transfer means in the operated position when the controller is in other operating positions.

4. In a control system for a machine having a motor disposed to be connected to a source of electrical energy through a controller and either of a pair of current collecting means, in combination, transfer means operable to connect the motor to one or another of the current collecting means, means controlling the operation of the transfer means responsive to predetermined load conditions, circuit means including contact means on the controller providing an operating circuit for operating the transfer means to connect the motor to or disconnect it from whichever of the current collecting means is connected to the source while the motor is connected to the controller, and additional circuit means including contact means on the controller and contact means on the load responsive means providing a holding circuit for maintaining the transfer means in the operated position.

5. In a control system for an electric motor disposed to be energized from one or another of a plurality of current collecting devices through a controller having a plurality of contact means, impedance means, a controller having contact means for connecting the impedance means and the motor in different operating relations, a single pair of switches each having an operating winding energizable to operate the switches to connect the impedance means and the motor to one or another of the current collecting devices, current responsive means, circuit means including contact members of the current responsive means and of the controller connected to effect connection of the operating windings to and disconnection of them from the current collecting devices only in a predetermined operating position of the controller, and additional circuit means including contact means of the switches and of the controller providing a holding circuit for the switches when the controller is in other than said predetermined position.

6. The combination with a motor disposed to be connected to a source of electrical energy through either of a pair of current collecting devices and a controller having a plurality of contact means, of a plurality of transfer switches each having an operating winding connected to one of the current collecting devices, said switches being operable to connect the motor to one or another of the current collecting devices, protective means responsive to a predetermined motor current and having a plurality of contact means, circuit means including contact means of the controller and the protective means providing an operating circuit for the operating winding of the transfer switch whose current collecting device is connected to the source only when the controller is in a predetermined operating position in which the motor is already connected through the controller, and additional circuit means including contact means of the controller and the protective means providing for retaining the transfer switch in the operated position during normal operating conditions.

7. A transfer system for a power circuit including a motor and a resistor with a controller for changing the connections thereof and disposed to be connected to either of a pair of current supply systems comprising, a transfer switch associated with each supply system having an operating winding connected therewith, circuit means including contact means operable only in a predetermined operating position of the controller to effect operation of whichever transfer switch has its current supply system connected to a source of electrical energy, and additional circuit means including additional contact means on the controller providing a holding circuit for the transfer switch while the controller is in other operating positions.

8. The combination with a power circuit including a motor, control means, and a controller disposed to be energized from a source of electrical energy through either a trolley or a cable reel device, of contact means on the controller for connecting and disconnecting the motor and control means, a single switch means connecting the motor and control means directly to either the trolley or the cable reel device through the controller, and circuit means including auxiliary contact means on the controller connected for selectively operating the switch means as line switches to respectively make and interrupt the connection of the power circuit to the source subsequent to the connection and prior to the disconnection of the motor and control means to and from the source by the controller.

9. The combination in a control system for a motor on a vehicle disposed to be energized through a controller from a trolley or a cable reel, of a pair of transfer switches selectively operable in interlocked relation to connect the motor to either the trolley or the cable reel, circuit means including auxiliary contact means on the controller for operating the switches to connect the motor to whichever of the trolley or cable reel is connected to a source of electrical energy and control means responsive to a predetermined motor current for deenergizing the motor by returning the operated transfer switch to the inoperative position.

10. A control system for a motor on a vehicle disposed to be energized from a source of electrical energy through either a trolley or a cable reel comprising, a trolley transfer switch operable to connect the motor to the trolley when the trolley is connected to the source, a reel transfer switch operable to connect the motor to the cable reel when the cable reel is connected to the source, current responsive means operable to return either of the switches to the inoperative position when the motor current exceeds a predetermined value, and a controller having contact means for varying the energization of the motor from the source and additional contact means for effecting operation of the transfer switches to connect and disconnect the motor and the source only in predetermined operating positions of the controller.

11. A control system for a vehicle having a pair of motors disposed to be energized from a source of electrical energy through either a trolley device or a cable reel device comprising, a trolley device switch having an operating winding and operable to connect the motor to the trolley device, a cable reel device switch having an operating winding and operable to connect the motor to the cable reel device, means mechanically interlocking said switches to prevent either of said switches from being closed while the other is closed, means responsive to a predetermined value of motor current operable to open either of the switches, a control resistor, and a motor controller having a plurality of contact means for changing the connections of the motors and the control resistor, said controller having additional contact means for providing an operating circuit for the transfer switch of the device connected to the source and interrupting it only after the motor and control resistors are connected together.

DAVID E. RENSHAW.
HERMAN C. KRAPF.

REFERENCES CITED

The following references are of record in the file of this patent:

UNITED STATES PATENTS

| Number | Name | Date |
|---|---|---|
| 1,652,194 | Brown | Dec. 13, 1927 |
| 1,903,704 | Levin et al. | Apr. 11, 1933 |
| 817,366 | Frank et al. | Apr. 10, 1906 |
| 1,808,277 | Wood | June 2, 1931 |